United States Patent
Liu et al.

(10) Patent No.: US 10,014,670 B2
(45) Date of Patent: Jul. 3, 2018

(54) ELECTRICAL APPARATUS HAVING A CYLINDRIC COVER CONTAINING AN ADSORBENT

(71) Applicant: Siemens Aktiengesellschaft, Munich (DE)

(72) Inventors: Qiang Liu, Shanghai (CN); Jun Wang, Shanghai (CN)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 15/535,886

(22) PCT Filed: Feb. 16, 2016

(86) PCT No.: PCT/EP2016/053247
§ 371 (c)(1),
(2) Date: Jun. 14, 2017

(87) PCT Pub. No.: WO2016/131816
PCT Pub. Date: Aug. 25, 2016

(65) Prior Publication Data
US 2017/0353016 A1    Dec. 7, 2017

(30) Foreign Application Priority Data
Feb. 16, 2015    (CN) .......................... 2015 1 0084999

(51) Int. Cl.
*H02B 13/055*    (2006.01)
*H02B 13/045*    (2006.01)
*H01H 33/56*    (2006.01)

(52) U.S. Cl.
CPC .......... *H02B 13/055* (2013.01); *H01H 33/56* (2013.01); *H02B 13/045* (2013.01)

(58) Field of Classification Search
CPC ..... H02B 13/055; H02B 13/045; H01H 33/56
(Continued)

(56) References Cited

U.S. PATENT DOCUMENTS 3,857,006 A * 12/1974 Daimon ................. H01H 33/56
218/84
3,941,963 A * 3/1976 Sasaki .................... H01H 33/14
218/63

(Continued)

FOREIGN PATENT DOCUMENTS

| CN | 1204134 A | 1/1999 |
|---|---|---|
| CN | 2901563 Y | 5/2007 |

(Continued)

OTHER PUBLICATIONS

Chinese Office Action dated May 27, 2017.
(Continued)

*Primary Examiner* — Anatoly Vortman
(74) *Attorney, Agent, or Firm* — Harness, Dickey & Pierce, P.L.C.

(57) ABSTRACT

An electrical apparatus containing an adsorbent, includes a housing, an adsorbent cover, an adsorbent and a locating bolt. The housing is cylindrical and has at least one locating hole. The adsorbent cover is installed in the housing, and has an annular groove in a circumferential direction, with the locating hole being opposite the groove. An outer diameter of a groove edge is the same as an inner diameter of the housing, while the diameter of a middle part of the groove is less than the inner diameter of the housing. The adsorbent is placed in the groove. The locating bolt passes through the locating hole and extends into the groove. The electrical apparatus has a simple structure. Since installation on a flange is not needed, a flange on the housing that is con- (Continued)

nected to an adsorbent container is dispensed with. The cost of the adsorbent container and housing are reduced.

16 Claims, 4 Drawing Sheets

(58) Field of Classification Search
 USPC .......................................................... 361/618
 See application file for complete search history.

(56) References Cited

U.S. PATENT DOCUMENTS

| | | | | |
|---|---|---|---|---|
| 5,997,616 | A * | 12/1999 | Ledru | H01H 33/562 |
| | | | | 55/417 |
| 2009/0166332 | A1 * | 7/2009 | Osumi | H02G 5/065 |
| | | | | 218/68 |
| 2012/0085735 | A1 | 4/2012 | Uchii et al. | |

FOREIGN PATENT DOCUMENTS

| | | | | |
|---|---|---|---|---|
| CN | 2901653 | Y | 5/2007 | |
| CN | 2901653 | Y | 5/2007 | |
| EP | 0140034 | A2 * | 5/1985 | ........... H02B 13/055 |
| EP | 2445068 | A1 | 4/2012 | |
| EP | 2455068 | A1 | 5/2012 | |
| JP | 56315110 | U | 2/1988 | |
| JP | S6315110 | U | 2/1988 | |
| JP | 5-25912 | * | 2/1993 | ........... H02B 13/055 |
| JP | 2007/300717 | A | 11/2007 | |
| JP | 2007300717 | A | 11/2007 | |

OTHER PUBLICATIONS

International Search Report PCT/ISA/210 for International Application No. PCT/EP2016/053247 dated Apr. 21, 2016.
Written Opinion of the International Searching Authority PCT/ISA/237 for International Application No. PCT/EP2016/053247 dated Apr. 21, 2016.

* cited by examiner

ELECTRICAL APPARATUS HAVING A CYLINDRIC COVER CONTAINING AN ADSORBENT

PRIORITY STATEMENT

This application is the national phase under 35 U.S.C. § 371 of PCT International Application No. PCT/EP2016/053247 which has an International filing date of Feb. 16, 2016, which designated the United States of America and which claims priority to Chinese patent application number CN20150084999.7 filed Feb. 16, 2015, the entire contents of which are hereby incorporated herein by reference.

FIELD

An embodiment of present invention generally relates to an electrical apparatus, in particular to an electrical apparatus containing an adsorbent.

BACKGROUND ART

An adsorbent is often used to absorb moisture inside an electrical apparatus and maintain dryness, as well as to adsorb particles inside the electrical apparatus which are not conducive to reliable operation thereof. For example, a gas-insulated metal-enclosed switchgear must be provided with an adsorbent in a gas chamber, for drying and filtering by adsorption the insulating gas.

At present, a relatively conventional solution is to place a bag of adsorbent in a bowl-shaped adsorbent container, and mount this on a housing of the switchgear via a round opening of the adsorbent container. To this end, an interface and a flange must be predesigned on the switchgear housing, to connect and fix the opening of the adsorbent container. Such a solution is structurally complex, high in cost, and is not convenient for installation. Moreover, when choosing an installation position for the adsorbent container, the latter cannot be positioned flexibly owing to restrictions imposed by the adsorbent container volume and the interface, and various types of adsorbent container must be designed. Furthermore, the flange itself on the switchgear housing also needs an external installation space, and this has an impact on housing design and the positioning of various switchgear modules.

SUMMARY

At least one embodiment of the present invention provides an electrical apparatus containing an adsorbent, comprising a housing, an adsorbent cover, an adsorbent and a locating bolt. The housing is cylindrical and has at least one locating hole. The adsorbent cover is installed in the housing, and has an annular groove in a circumferential direction, with the locating hole being opposite the groove. An outer diameter of a groove edge is the same as an inner diameter of the housing, while the diameter of a middle part of the groove is less than the inner diameter of the housing. The adsorbent is placed in the groove. The locating bolt passes through the locating hole, and extends into the groove.

BRIEF DESCRIPTION OF THE DRAWINGS

The accompanying drawings below merely illustrate and explain the present invention schematically, without defining the scope thereof.

KEY TO LABELS

Figure 1:
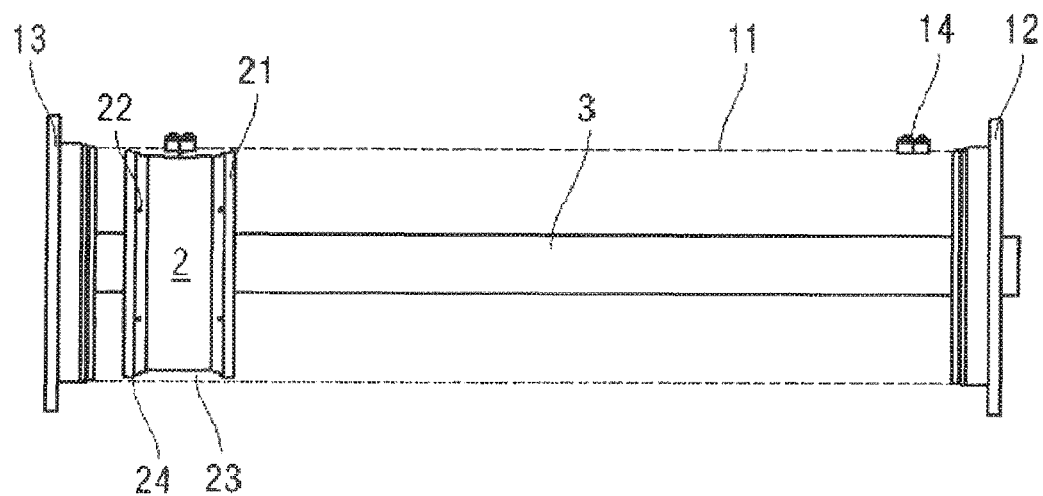
FIG. 1 is a schematic diagram of an electrical apparatus containing an adsorbent of an embodiment of the present invention, showing an adsorbent cover installed in a cylindrical housing.

| 11 | housing | 3 | conductor |
|---|---|---|---|
| 12, 13 | flange | 41 | boss |
| 14 | unthreaded gas-filling hole | 42 | cover plate |
| 2 | absorbent cover | 43 | fixing bolt |
| 21 | groove edge | 44 | sealing ring |
| 22 | hole | 45 | locating bolt |
| 23 | groove | 46 | locating hole |
| 24 | gap | III | local view |
| 25 | projection | | |

DETAILED DESCRIPTION OF THE EXAMPLE EMBODIMENTS

At least one embodiment of the present invention provides an electrical apparatus containing an adsorbent, comprising a housing, an adsorbent cover, an adsorbent and a locating bolt. The housing is cylindrical and has at least one locating hole. The adsorbent cover is installed in the housing, and has an annular groove in a circumferential direction, with the locating hole being opposite the groove. An outer diameter of a groove edge is the same as an inner diameter of the housing, while the diameter of a middle part of the groove is less than the inner diameter of the housing. The adsorbent is placed in the groove. The locating bolt passes through the locating hole, and extends into the groove.

The electrical apparatus containing an adsorbent of at least one embodiment of the present invention has a simple structure. Since installation on a flange is not needed, an interface flange on the housing that is connected to an adsorbent container is dispensed with, and while reducing the cost of the adsorbent container itself, the cost of the housing is also reduced, the housing interface is simplified, and the external space needed for installation is saved, so that flexible installation and positioning are possible, and there is no need to design different types of adsorbent cover, or the number of types needed is relatively small. The electrical apparatus containing an adsorbent of the present invention has a good adsorption effect, and the volume in which adsorbent can be packed is large.

According to one embodiment of the present invention, the adsorbent cover has multiple openings at the groove edge.

According to another embodiment of the present invention, the adsorbent cover has multiple holes. According to another aspect of the present invention, a cover plate is fixed on the locating hole, with a sealing ring installed between the cover plate and the locating hole.

According to another embodiment of the present invention, the bottom of the groove is an arc.

According to another embodiment of the present invention, the bottom of the groove is a straight line.

According to another embodiment of the present invention, the bottom of the groove has a threaded hole in which the locating bolt is screwed.

According to another embodiment of the present invention, the housing has at least two locating holes, one of the locating holes being close to one of the groove edges of the groove, and the other of the locating holes being close to another of the groove edges of the groove.

According to another embodiment of the present invention, the electrical apparatus is a gas-insulated metal-enclosed switchgear, and the locating hole is formed by processing an unthreaded gas-filling hole. When the electrical apparatus containing an adsorbent is a switchgear, the housing cost is reduced and the housing interface is simplified because a flange is dispensed with and an unthreaded gas-filling hole is used instead. Also, since the external space needed for installation is saved, flexible installation of various switchgear modules is possible.

Example embodiments will be explained below in a clear and easy to understand way in conjunction with the accompanying drawings, to further explain the abovementioned characteristics, technical features and advantages of the present invention, as well as ways of implementing same.

Particular embodiments of the present invention are now explained with reference to the accompanying drawings, to furnish a clearer understanding of the technical features, object and effects of the present invention; identical labels in the drawings indicate components with the same structure or components with similar structures but the same function.

In this text, "schematic" means "serving as a real instance, an example or an illustration". No drawing or embodiment described as "schematic" herein should be interpreted as a more preferred or more advantageous technical solution.

To make the drawings appear uncluttered, only those parts relevant to the present invention are shown schematically in the drawings; they do not represent the actual structure thereof as a product. Furthermore, to make the drawings appear uncluttered for ease of understanding, in the case of components having the same structure or function in certain drawings, only one of these is drawn schematically, or only one is marked.

In this text, "a" does not only mean "just this one", but may also mean the case of "more than one". In this text, "top", "bottom", "front", "rear", "left" and "right" etc. are merely used to indicate a positional relationship between relevant parts, not to define their absolute positions.

FIG. 1 shows schematically an electrical apparatus containing an adsorbent, comprising a housing 11, an adsorbent cover 2, an adsorbent and a locating bolt 45. The housing 11 is cylindrical and has at least one locating hole 46. The adsorbent cover 2 is installed in the housing 11, and has an annular groove 23 in a circumferential direction, with the locating hole 46 being opposite the groove 23. An outer diameter of a groove edge 21 is the same as an inner diameter of the housing 11, while the diameter of a middle part of the groove 2 is less than the inner diameter of the housing 11. Those skilled in the art will appreciate that even though the outer diameter of the groove edge 21 is the same as the inner diameter of the housing 11, there will still be a gap 24 between the groove edge 21 and the housing 11. The size of the gap 24 may vary somewhat, but it must be ensured that when installed in the housing 11, the adsorbent cover 2 can be well supported by the housing 11, without having to rely on another device. The adsorbent is placed in the groove 23. The locating bolt 45 passes through the locating hole 46, and extends into the groove 23.

Figure 2:
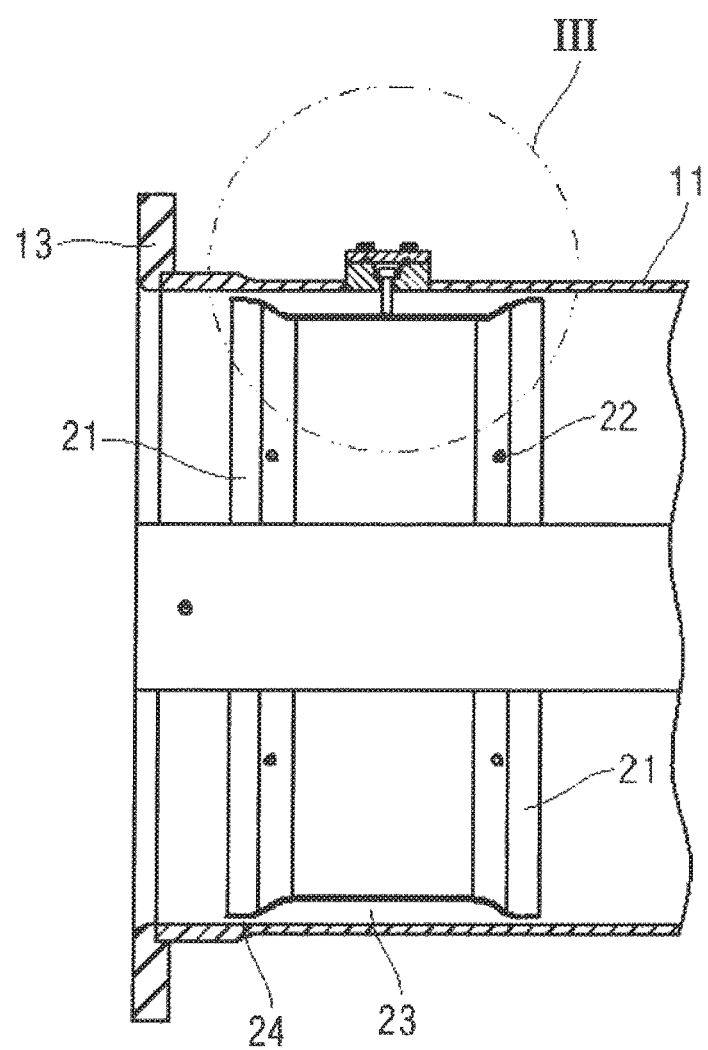
FIG. 2 further shows the adsorbent cover in FIG. 1 as well as a flange on the left side of the housing.

According to an embodiment of the present invention which is not shown, the adsorbent cover 2 has multiple openings at the groove edge 21. These openings can enlarge the gap 24 locally in the circumferential direction of the groove 2, so as to allow gas in the housing 11 to enter/exit the adsorbent cover 2 better. These openings may be arranged uniformly at intervals along the groove edge 21. Such a design will not affect the support which the housing 11 provides for the adsorbent cover 2. Alternatively, as shown in FIGS. 1 and 2, it is also possible for the adsorbent cover to have multiple holes 22, to allow gas in the housing 11 to enter/exit the adsorbent cover 2 better.

Figure 3:
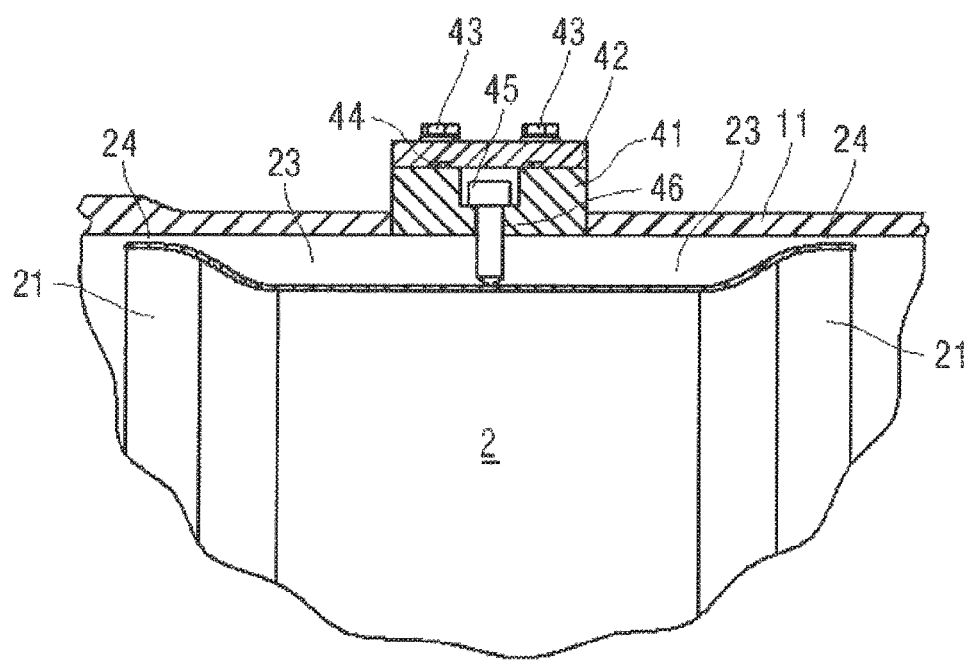
FIG. 3 shows schematically the local view III in FIG. 2.

The locating bolt 45 is used to locate the adsorbent cover 2, and prevent it from moving in the axial direction of the housing 11. The locating bolt 45 can pass through the locating hole 46 in an airtight fashion; for example, the locating hole 46 is a threaded hole. If this is not sufficient to ensure airtightness or in order to increase the safety factor, a cover plate 42 may be fixed on the locating hole 46, as shown in the local view III in FIG. 2, which is shown in FIG. 3. A sealing ring 44 is installed between the cover plate 42 and the locating hole 46, and fixing is performed by means of fixing bolts 43, to increase airtightness.

Figure 4:
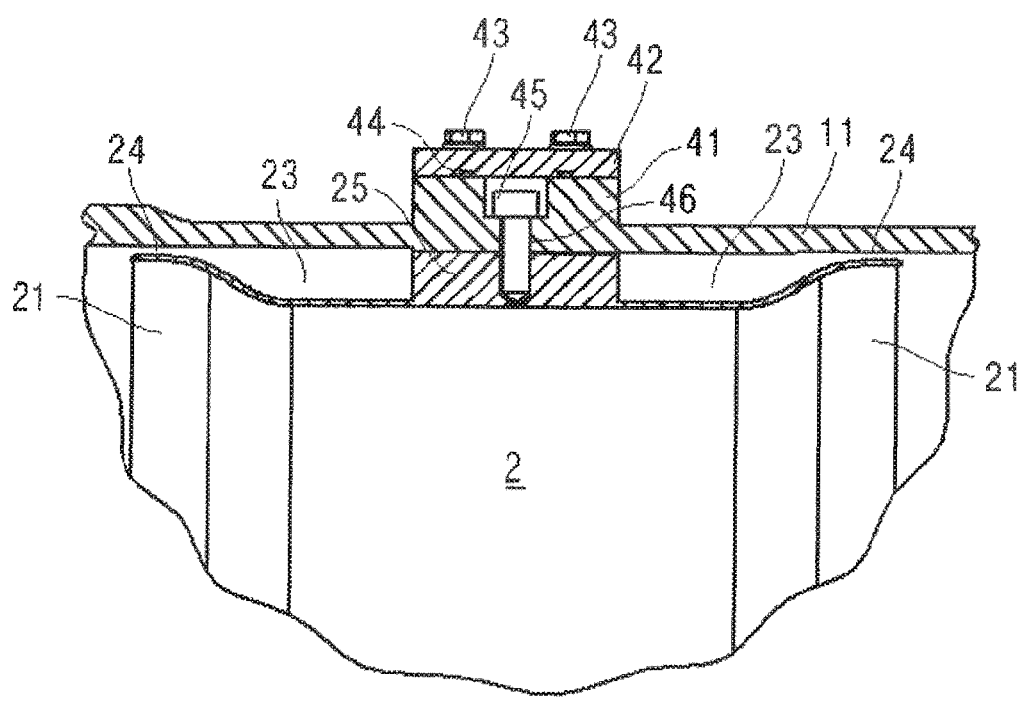
FIG. 4 shows schematically another embodiment of the locating hole and groove.

The locating hole 46 may be a counterbored threaded hole as shown in FIG. 3, but may also be a through-hole. The locating hole 46 is disposed in a boss 41, wherein the boss 41 may be connected by welding to another part of the housing as shown in FIG. 3, or may form a single piece together with the housing 11 as shown in FIG. 4.

The bottom of the groove 23 may be a straight line as shown in the figures, or may be an arc, as in an embodiment which is not shown, as long as electric field requirements can be met. In the case where the bottom of the groove 23 is a straight line, the adsorbent cover 2 may have a threaded hole at the bottom of the groove 23 as shown in FIG. 4, to facilitate positioning by screwing in the locating bolt 45, wherein the threaded hole is located in a projection 25 of the adsorbent cover 2.

In another embodiment which is not shown, in the case where the bottom of the groove 23 is a straight line, the housing 11 has at least two locating holes; one of the locating holes is close to one groove edge 21 of the groove 23, while the other of the locating holes is close to the other groove edge 21 of the groove 23. Thus, although the locating bolts 45 are not connected to the adsorbent cover 2, movement of the adsorbent cover 2 in the axial direction of the housing 11 can still be prevented, as long as the length of the locating bolts 45 is greater than the width of the gap 24.

Although the two ends of the housing 11 in FIG. 1 are provided with a flange 12 and a flange 13 respectively, and a conductor 3 arranged along the axis of the housing 11 passes through the center of the adsorbent cover 2, the adsorbent cover 2 may also be used with other cylindrical housings, as long as the adsorbent cover 2 meets the corresponding electric field requirements. The interior of many electrical apparatuses, e.g. gas-insulated metal-enclosed switchgear, is filled with high-pressure insulating gas.

Correspondingly, an unthreaded gas-filling hole is often provided on the housing of such electrical apparatuses, e.g. two unthreaded gas-filling holes 14 close to flanges 12 and 13 respectively as shown in FIG. 1. An unthreaded gas-filling hole can be modified to form a locating hole 46 by simple processing, e.g. by merely processing an idle unthreaded gas-filling hole according to the corresponding dimensions of a locating bolt 45.

It should be appreciated that although the description herein is based on various embodiments, it is by no means the case that each embodiment only contains one independent technical solution. This manner of presentation is employed herein purely for the sake of clarity. Those skilled in the art should consider the description in its entirety. The technical solutions in the various embodiments may also be suitably combined to form other embodiments capable of being understood by those skilled in the art.

The series of detailed explanations set out above are merely specific explanations of feasible embodiments of the present invention. They are not intended to limit the scope of protection of the present invention. All equivalent embodiments or changes made without departing from the artistic spirit of the present invention, such as combinations, divisions or repetitions of features, shall be included in the scope of protection of the present invention.

The invention claimed is:

1. An electrical apparatus containing an adsorbent, comprising:
    a housing, the housing being cylindrical and including at least one locating hole;
    an adsorbent cover, installed in the housing and including an annular groove in a circumferential direction, the at least one locating hole being opposite the annular groove, an outer diameter of a groove edge of the annular groove being the same as an inner diameter of the housing, and a diameter of a middle part of the annular groove being less than the inner diameter of the housing;
    the adsorbent, placed in the annular groove; and
    a locating bolt, passing through the at least one locating hole and extending into the annular groove.

2. The electrical apparatus of claim 1, wherein the adsorbent cover includes multiple openings at the groove edge.

3. The electrical apparatus of claim 1, wherein the adsorbent cover includes multiple holes.

4. The electrical apparatus of claim 1, wherein a cover plate is fixed on the at least one locating hole, a sealing ring being installed between the cover plate and the at least one locating hole.

5. The electrical apparatus of claim 1, wherein a bottom of the annular groove is an arc.

6. The electrical apparatus of claim 1, wherein a bottom of the annular groove is a straight line.

7. The electrical apparatus of claim 6, wherein the bottom of the annular groove includes a threaded hole in which the locating bolt is screwed.

8. The electrical apparatus of claim 6, wherein the housing includes at least two locating holes, one of the at least two locating holes being relatively closer to one of the groove edges of the annular groove and another of the at least two locating holes being relatively closer to another one of the groove edges of the annular groove.

9. The electrical apparatus of claim 1, wherein the electrical apparatus is a gas-insulated metal-enclosed switchgear, and wherein the at least one locating hole is formed by processing an unthreaded gas-filling hole.

10. The electrical apparatus of claim 2, wherein the electrical apparatus is a gas-insulated metal-enclosed switchgear, and wherein the at least one locating hole is formed by processing an unthreaded gas-filling hole.

11. The electrical apparatus of claim 3, wherein the electrical apparatus is a gas-insulated metal-enclosed switchgear, and wherein the at least one locating hole is formed by processing an unthreaded gas-filling hole.

12. The electrical apparatus of claim 4, wherein the electrical apparatus is a gas-insulated metal-enclosed switchgear, and wherein the at least one locating hole is formed by processing an unthreaded gas-filling hole.

13. The electrical apparatus of claim 5, wherein the electrical apparatus is a gas-insulated metal-enclosed switchgear, and wherein the at least one locating hole is formed by processing an unthreaded gas-filling hole.

14. The electrical apparatus of claim 6, wherein the electrical apparatus is a gas-insulated metal-enclosed switchgear, and wherein the at least one locating hole is formed by processing an unthreaded gas-filling hole.

15. The electrical apparatus of claim 7, wherein the electrical apparatus is a gas-insulated metal-enclosed switchgear, and wherein the at least one locating hole is formed by processing an unthreaded gas-filling hole.

16. The electrical apparatus of claim 8, wherein the electrical apparatus is a gas-insulated metal-enclosed switchgear, and wherein the at least two locating holes are formed by processing an unthreaded gas-filling hole.

* * * * *